9710X
S. Cram,
Inclined Railroad,
Patented June 11, 1836.
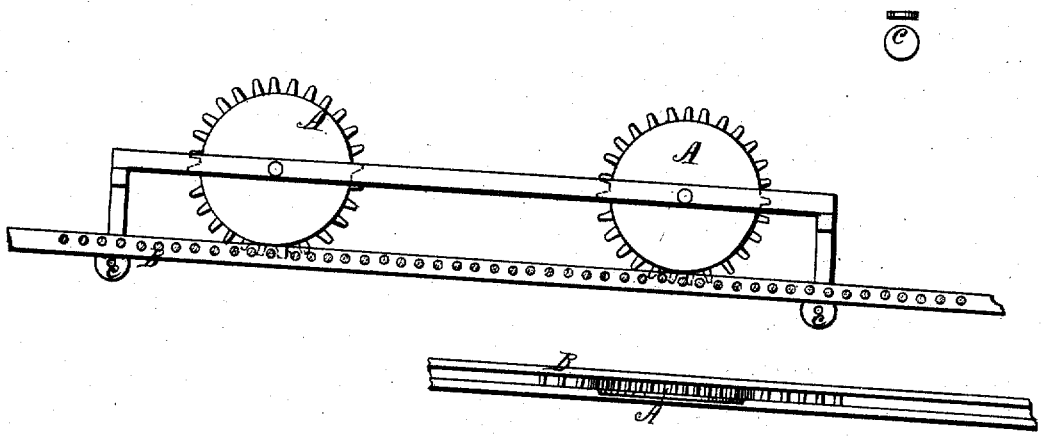
THE NORRIS PETERS CO., PHOTO-LITHO., WASHINGTON, D. C.

X9710 June 11 1836

Smith Cram. of City, County & State of New York.

Letters Patent.

The schedule referred to in these Letters Patent and making part of the same
containing a description in the words of the said Smith Cram himself
of his improvement in the method of taking a train of cars over eminences
by Locomotive Engines. —

Be it known that I Smith Cram of New York in the County of New
York, and State of New York, have invented a new and useful improve
-ment in the method of taking a Train of cars over eminences by loco-
-motion, which is described as follows, reference being had to the annexed
drawings of the same making part of this specification.
The method of said Cram consists chiefly in the construction of the
wheels of the locomotive to be used and the track or tracks on which
it is to move. A track up the eminence is to be constructed paral
lel, with the track on which the train of cars is to move. The tracks
of the Locomotive are made in effect as two racks such as are represent
ed at A. & B. in the Drawings, into which teeth C, formed in and
projecting from the arms or peripheries of the wheels may freely take the
weight of the Locomotive being borne upon, the flat part of such racks
constructed of flat bars, as far apart as the width of the teeth each bar
being about one inch and a half wide and the teeth of sufficient
width to have the strength in them necessary to take up the ascending
or descending train when working against the teeth of the racks, which
consist of round bars secured between said flat bars or otherwise.
This Locomotive being attached laterally or otherwise to the train and
put in motion, takes it up or down by the action of the teeth in the wheels
of the Locomotive, upon the racks constructed as aforesaid, and to pre-
vent the Locomotive from running back when ascending or running
down too fast when descending there are catches constructed to take 242 9710X into the teeth in said racks, or into the teeth in said wheels in any convenient manner. And the said Crane to prevent cars from being thrown off the track constructs the track so far above ground on the inside of the tracks as to prevent rollers securely fixed to the locomotive or cars on each side thereof and near the wheels to take under the track plates so that the locomotive or car cannot be thrown off without tearing up the rails or track plates.

And the said Crane to prevent the vibrating or swinging of the cars when in speed, fixes horizontal wheels to run against the inside of the rails or plates in the most convenient and proper manner.

And what the said Crane claims as his invention and desires to secure by Letters Patent, is the method of forming the racks as before specified and described for taking trains of cars over [illegible] and boats or vessels from one level to another in canal navigation Witnesses
Wm P. Elliot
Joseph Cowden Smith Crane Exd.
W.G.C.

[602 words]

(June 11. 1836)

Drawing

763

Phineas Bennet .. Ithaca, N. Y.
(Patented Dec. 2. 1834. Reissued July 25. 1836)
Letters Patent.

The Schedule referred to in these Letters Patent and making part of the same containing a description in the words of the said Phineas Bennet himself of his improvement in the Screw Saw Mill Dog for which Letters Patent were granted, dated the 2nd day of December 1834, which Letters Patent are hereby cancelled